United States Patent
Ito et al.

(10) Patent No.: US 6,767,478 B2
(45) Date of Patent: *Jul. 27, 2004

(54) MN-ZN FERRITE AND COIL COMPONENT USING SAME

(75) Inventors: Kiyoshi Ito, Iwata-gun (JP); Osamu Kobayashi, Iwata-gun (JP); Yukio Suzuki, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 25 days.

This patent is subject to a terminal disclaimer.

(21) Appl. No.: 10/210,055

(22) Filed: Aug. 2, 2002

(65) Prior Publication Data

US 2003/0034096 A1 Feb. 20, 2003

(30) Foreign Application Priority Data

Aug. 10, 2001 (JP) ........................ 2001-244439

(51) Int. Cl.⁷ .................................................. B22F 1/00

(52) U.S. Cl. ................ 252/62.62; 252/62.59; 252/62.6; 252/62.64; 252/62.58

(58) Field of Search ............... 252/62.62, 62.57, 252/62.6, 62.64, 62.58

(56) References Cited

U.S. PATENT DOCUMENTS

| | | | |
|---|---|---|---|
| 6,210,598 B1 * | 4/2001 | Kobayashi et al. | 252/62.62 |
| 6,296,791 B1 * | 10/2001 | Kobayashi et al. | 264/37.3 |
| 6,403,017 B1 * | 6/2002 | Kobayashi et al. | 264/613 |
| 6,440,323 B1 * | 8/2002 | Kobayashi et al. | 252/62.62 |
| 6,461,531 B2 * | 10/2002 | Kobayashi et al. | 252/62.59 |
| 2003/0059365 A1 * | 3/2003 | Ito et al. | 423/594 |

FOREIGN PATENT DOCUMENTS

| | | |
|---|---|---|
| EP | 1 101 736 A1 | 5/2001 |
| JP | Hei 9-180925 | 7/1997 |
| JP | 2000-353613 | 12/2000 |
| WO | WO 98/32140 A1 | 7/1998 |

* cited by examiner

Primary Examiner—C. Melissa Koslow
(74) Attorney, Agent, or Firm—Oliff & Berridge, PLC

(57) ABSTRACT

The Mn—Zn ferrite of the present invention contains basic components of 44.0 to 50.0 mol % (50.0 mol % is excluded) $Fe_2O_3$, 4.0 to 26.5 mol % ZnO and the remainder MnO, and has a real part $\epsilon'$ of complex relative permittivity of 20,000 or less at 1 kHz and 50 or less at 1 MHz, thereby maintaining initial permeability in a wide frequency band, showing a low stray capacitance with a coil provided, and ensuring an excellent impedance in a wide frequency band. And a coil using the Mn—Zn ferrite as a magnetic core is also provided.

3 Claims, 1 Drawing Sheet

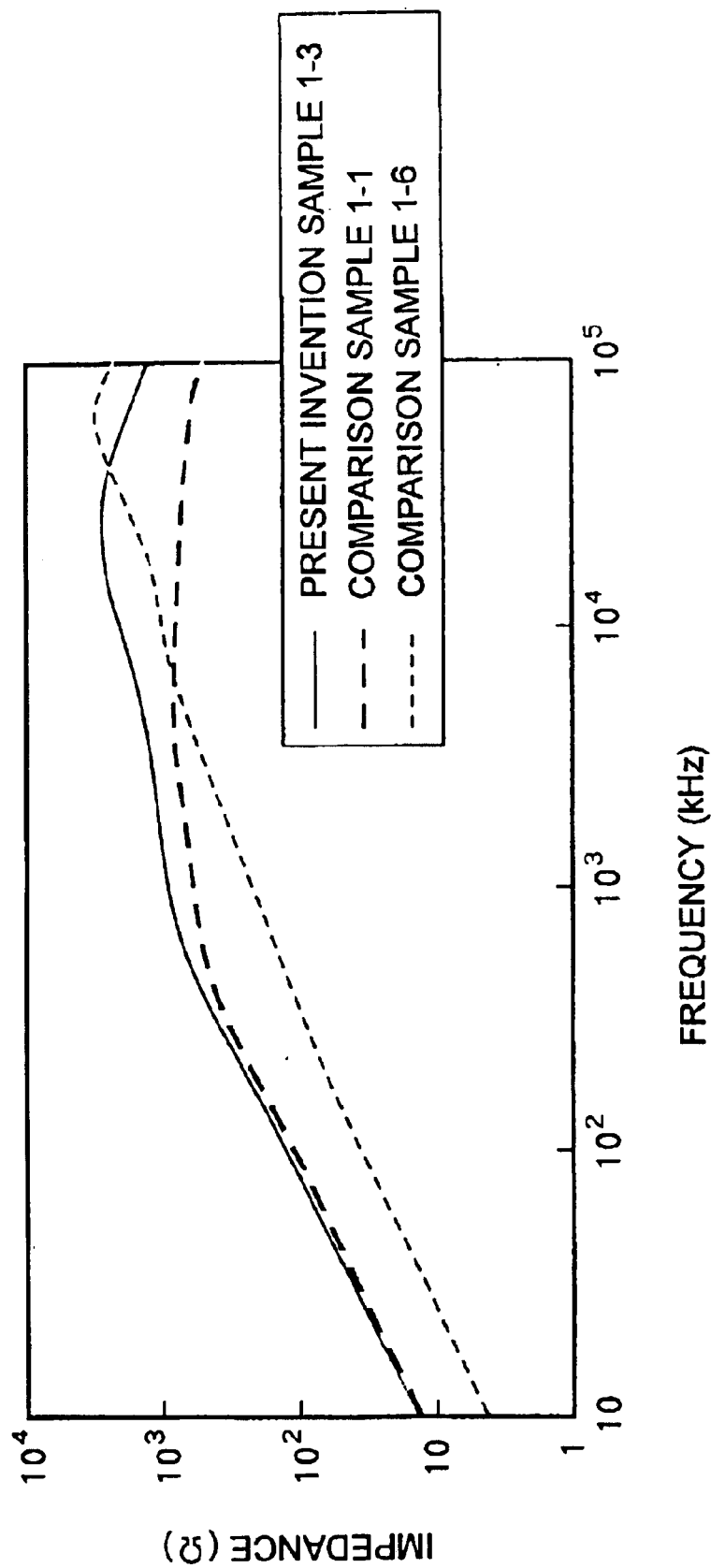

MN-ZN FERRITE AND COIL COMPONENT USING SAME

BACKGROUND OF THE INVENTION

1. Field of the Invention

The present invention relates to Mn—Zn ferrite and a coil component using Mn—Zn ferrite as a magnetic core, and in particular to Mn—Zn ferrite and a coil component suitable for switching power supplies, noise filters, choke coils and so forth.

2. Description of the Related Art

Magnetic core materials for use in noise filters such as line filters for EMI countermeasures are desired to have high impedance in a frequency band where noises should be removed. Impedance in a high frequency band can be increased through the phenomenon of resonance between the stray capacitance (C) of a coil and the inductance (L) of a core. It is known that impedance is maximum at the resonance frequency ($1/\sqrt{LC}$). It is also known that impedance at a frequency lower than the resonance frequency is proportional to the initial permeability of a core, and impedance at a frequency higher than the resonance frequency is inversely proportional to the stray capacitance of a coil.

Mn—Zn ferrite that has high permeability in a wide frequency band has been studied intensively and disclosed in, for example, Japanese Patent Laid-open Nos. 2000-353613 and Hei 9-180925. The initial permeability of Mn—Zn ferrite is closely related to a real part $\epsilon'$ of complex relative permittivity, and when $\epsilon'$ has a large value, the initial permeability is relaxed in a high frequency band and cannot be maintained through up to a high frequency band. As a result, it is difficult to obtain excellent impedance properties in a high frequency band.

While Japanese Patent Laid-open No. 2000-353613 mentioned above does not describe dielectric properties or impedance properties, Japanese Patent Laid-open No. Hei 9-180925 refers to permittivity (relative permittivity) $\epsilon$, and describes the relative permittivity $\epsilon$ as reading 50,000 to 1,000,000 at 1 KHz, which is very high. Usually, complex relative permittivity $\epsilon$ is expressed as ($\epsilon'$-j$\epsilon''$), and although the above-mentioned relative permittivity $\epsilon$ is not separated into a complex component and a real component, generally, in case of polycrystalline Mn—Zn ferrite, $\epsilon''/\epsilon'=0.5$ to 1.5. Accordingly, $\epsilon'$ may be estimated to range from 30,000 to 60,000 at the lowest, which is a very high value. The real part $\epsilon'$ of complex relative permittivity with such a high value at 1 kHz not only can never be 50 or less at 1 MHz, but also causes relaxation of initial permeability in the vicinity of 500 kHz making it impossible to maintain the initial permeability through up to a high frequency band of 1 MHz or more.

The present inventors have found that a coil component comprising a magnetic core of conventional Mn—Zn ferrite having a high real part $\epsilon'$ of complex relative permittivity scarcely reduces stray capacitance despite whatever optimizations of its winding conditions. The stray capacitance of a coil component is roughly classified into capacitance between coils and capacitance between a coil and a core. The former is determined based on the winding conditions of a coil and the latter is determined based on the material properties of a magnetic core, both increasing as the real part $\epsilon'$ of complex relative permittivity increases. Therefore, in the coil component with a magnetic core of conventional Mn—Zn ferrite having a high real part $\epsilon'$ of complex relative permittivity, the capacitance between a coil and a core is extremely high as compared with the capacitance between coils. As a result, the optimization of winding conditions has been hardly effective in reducing the stray capacitance of the component.

When designing a magnetic core material and a coil component to be used in a high frequency band, two requirements must be met to reduce stray capacitance: one is to use a magnetic core material that maintains high permeability through up to a high frequency band and the other is to optimize its winding conditions. The coil component using conventional Mn—Zn ferrite as its magnetic core satisfies neither of the two requirements, making it difficult to obtain high impedance in a wide frequency band.

SUMMARY OF THE INVENTION

The present invention has been made in consideration of the above-mentioned conventional problems, and an object of the present invention is therefore to provide Mn—Zn ferrite that maintains initial permeability over a wide frequency band, has small stray capacitance when provided with a coil, and has excellent impedance properties over a wide frequency band, and also a coil component made thereof.

In Mn—Zn ferrite according to the present invention, basic components include 44.0 to 50.0 mol % (50.0 mol % excluded) $Fe_2O_3$, 4.0 to 26.5 mol % ZnO and the remainder MnO, and its real part $\epsilon'$ of complex relative permittivity is 20,000 or less at 1 kHz and 50 or less at 1 MHz, respectively.

The Mn—Zn ferrite of the present invention may further contain as additive at least one of 0.01 to 4.0 mass % $SnO_2$ and 0.01 to 3.0 mass % $TiO_2$ (provided that an upper limit is 4% in total when both thereof are contained). The Mn—Zn ferrite of the present invention may also contain as additive at least one of 0.01 to 2.0 mass % CuO, 0.01 to 2.0 mass % NiO, 0.01 to 2.0 mass % CoO, 0.01 to 2.0 mass % MgO, 0.01 to 2.0 mass % $Al_2O_3$ and 0.01 to 2.0 mass % $Cr_2O_3$ (provided that an upper limit in total is 2 mass % when two or more thereof are contained).

A coil component according to the present invention uses the above-described Mn—Zn ferrite as a magnetic core.

The Mn—Zn ferrite and the coil component according to the present invention can provide good impedance properties over a wide frequency band and effectively convert noises at a practically critical frequency band of 10 to 100 MHz into thermal energy and absorb them. Thus, they prove to be very useful.

BRIEF DESCRIPTION OF THE ATTACHED DRAWING

FIG. 1 is a graph illustrating frequency properties of impedance of the present invention samples and comparative samples.

DETAILED DESCRIPTION OF THE PREFERRED EMBODIMENTS

Mn—Zn ferrite according to the present invention has basic component composition consisting of 44.0 to 50.0 mol % (50.0 mol % excluded) $Fe_2O_3$, 4.0 to 26.5 mol % ZnO and the remainder MnO as described above. During production thereof, mixed powder whose components have been adjusted so as to have the above-mentioned composition is pressed, and then sintered and cooled in an atmosphere containing a suitable amount of oxygen or in an atmosphere of oxygen concentration obtained according to the following expression (1):

$$\log P_{O_2} = -14{,}540/(T+273) + b \qquad (1)$$

where T is temperature (° C.), $P_{O_2}$ is relative partial pressure of oxygen and b is a constant ranging from 6 to 21. The reason the constant b is set to 6 to 21 is that a value greater than 21 makes the atmosphere substantially identical with the atmospheric air, which dies not justify prescription of oxygen concentration, and that a value smaller than 6 makes excessive FeO produced making electrical resistivity too low resulting in deterioration in initial permeability in a high frequency band though the constant b is desired to be as small as possible in order to increase the initial permeability in a low frequency band. In consideration of the object of the present invention, the content of iron component in the form of FeO is desirably less than 1 mol %.

In the Mn—Zn ferrite according to the present invention, $Fe_2O_3$ content of less than 44.0 mol % considerably decreases the initial permeability and saturation magnetic flux density. On the other hand, $Fe_2O_3$ content exceeding 50.0 mol % makes the real part $\epsilon'$ of complex relative permittivity larger than 20,000 at 1 kHz and larger than 50 at 1 MHz. Therefore, the $Fe_2O_3$ content is set to 44.0 to 50.0 mol % (50.0 mol % excluded), whereby the Mn—Zn ferrite sintered in an atmosphere containing a suitable amount of oxygen or in an atmosphere with oxygen concentration calculated according to the above expression (1) using any one of values ranging from 6 to 21 as the constant b has a real part $\epsilon'$ of complex relative permittivity of 20,000 or less at 1 kHz and 50 or less at 1 MHz, respectively. As a result, the initial permeability can be maintained over a wide frequency band and distribution capacity with a coil provided is decreased particularly in a high frequency band, thereby providing excellent impedance properties over a wide frequency band.

In the present invention, the magnetic properties such as initial permeability and saturation magnetic flux density may be varied not so much as to cause a practical problem, as far as the property of the real part $\epsilon'$ of complex relative permittivity mentioned above is satisfied. However, ZnO content of less than 4.0 mol % decreases the initial permeability considerably while ZnO exceeding 26.5 mol % decreases the saturation magnetic flux density considerably. Therefore, the ZnO content must be set to range from 4.0 to 26.5 mol %.

Impedance characteristic of a ferrite core can be separated into a reactance component and a resistance component. The reactance component is dominant in the low frequency band and converts noises into magnetic energy to thereby remove them, while the resistance component is dominant in the high frequency band and converts noises into thermal energy to thereby remove them. A frequency (to be referred to as $f_k$), at which the both components join with each other, constitutes a border between the both components. Usually, the more the resistance component exists, the better it is for removing noises. With the same impedance properties, the $f_k$ is preferred to be lower. Addition of $SnO_2$ and $TiO_2$ shifts the frequency ($f_k$) toward a lower frequency without changing the impedance properties.

In the present invention, at least one of $SnO_2$ and $TiO_2$ is added as additive to the above-mentioned basic component composition based on the above finding. However, if the amount of the additives is too small, the above-mentioned effect is small, whereas excessive addition thereof increases the real part $\epsilon'$ of complex relative permittivity at 1 kHz. Accordingly, it is desirable that the $SnO_2$ content be set to 0.01 to 4.0 mass % and $TiO_2$ content be set to 0.01 to 3.0 mass %. In this instance, the $SnO_2$ and $TiO_2$ may originally be tin oxide and titanium oxide, respectively, or may be from compounds that, when sintered, are converted into tin oxide and titanium oxide, respectively. When any of the oxides or the compounds is used alone by itself, its addition amount is set to the above-mentioned range in terms of mass ratio with the amount converted into $SnO_2$ or $TiO_2$. When they are used in combination, the addition amount in total may desirably be set to 0.02 to 4.0 mass % in terms of mass ratio with the amounts converted into $SnO_2$ and $TiO_2$.

The Mn—Zn ferrite according to the present invention may further contain as additive at least one of CuO, NiO, CoO, MgO, $Al_2O_3$ and $Cr_2O_3$ each in an amount of 0.01 to 2.0 mass %.

CuO decreases the real part $\epsilon'$ of complex relative permittivity at 1 kHz and 1 MHz and therefore is effective in improving the impedance properties in a frequency range above the resonance frequency. However, the effectiveness is small with too small amount of addition thereof, while excessive addition thereof causes the relaxation of initial permeability thereby making it difficult for resonance to take place. Therefore, the amount of addition is desirably set to the above-mentioned range. In this case, the CuO may originally be copper oxide or may be from compound that, when sintered, is converted into copper oxide. When the copper oxide or the compound is used alone by itself, its addition amount is set to the above-mentioned range in terms of mass ratio with the amount converted into CuO.

NiO decreases the real part $\epsilon'$ of complex relative permittivity at 1 kHz and 1 MHz, and therefore is effective in improving impedance properties in a frequency range above the resonance frequency. However, the effectiveness is small with too small amount of addition thereof, while excessive addition thereof causes the relaxation of initial permeability thereby making it difficult for resonance to take place. Therefore, the amount of addition is desirably set to the above-mentioned range. In this case, the NiO may originally be nickel oxide or may be from compound that, when sintered, is converted into nickel oxide. When the nickel oxide or the compound is used alone by itself, its addition amount is set to the above-mentioned range in terms of mass ratio with the amount converted into NiO.

CoO decreases the real part $\epsilon'$ of complex relative permittivity at 1 kHz and 1 MHz, and therefore is effective in improving impedance properties in a frequency range above the resonance frequency. Further, $Co^{2+}$, when dissolved at B site of spinel, has positive crystal magnetic anisotropy, and nullifies the overall crystal magnetic anisotropy thus increasing the initial permeability, and improving impedance properties in a frequency range below the resonance frequency. However, the effectiveness is small with too small amount of addition thereof, while excessive addition thereof considerably increases the positive crystal magnetic anisotropy and magnetostriction to cause deterioration of magnetic properties. Therefore, the amount of addition is desirably set to the above-mentioned range. In this case, the CoO may originally be cobalt oxide or may be from compound that, when sintered, is converted into cobalt oxide. When the cobalt oxide or the compound used alone by itself, its addition amount is set to the above-mentioned range in terms of mass ratio with the amount converted into CoO.

MgO decreases the real part $\epsilon'$ of complex relative permittivity at 1 kHz and 1 MHz, and therefore is effective in improving impedance properties in a frequency range above the resonance frequency. However, the effectiveness is small with too small amount of addition thereof, while excessive addition thereof causes the relaxation of initial permeability thereby making it difficult for resonance to take place. Therefore, the amount of addition is desirably set to the above-mentioned range. In this case, MgO may originally be magnesium oxide or may be from compound that, when sintered, is converted into magnesium oxide. When the magnesium oxide or the compound is used alone by itself, its addition amount is set to the above-mentioned range in terms of mass ratio with the amount converted into MgO.

$Al_2O_3$ decreases the real part $\epsilon'$ of complex relative permittivity at 1 kHz and 1 MHz, and therefore is effective in improving impedance properties in a frequency range above the resonance frequency. However, the effectiveness is small with too small amount of addition thereof, while excessive addition thereof causes deterioration of sintering property. Therefore, the amount of addition is desirably set to the above-mentioned range. In this case, $Al_2O_3$ may originally be aluminum oxide or may be from compound that, when sintered, is converted into aluminum oxide. When the aluminum oxide or the compound is used alone by itself, its addition amount is set to the above-mentioned range in terms of mass ratio with the amount converted into $Al_2O_3$.

$Cr_2O_3$ greatly decreases the real part $\epsilon'$ of complex relative permittivity at 1 kHz and 1 MHz, and therefore is effective in improving impedance properties in a frequency range above the resonance frequency. Further, $Cr^{3+}$, when solid-dissolved at B site of spinel, has positive crystal magnetic anisotropy, though weak, and nullifies the overall crystal magnetic anisotropy thus increasing the initial permeability and improving impedance properties in a frequency range below the resonance frequency. However, the effectiveness is small with too small amount of addition thereof, while excessive addition thereof causes deterioration of sintering property. Therefore, the amount of addition is desirably set to the above-mentioned range. In this case, $Cr_2O_3$ may originally be chromium oxide or may be from compound that, when sintered, is converted into chromium oxide. When the chromium oxide or the compound is used alone by itself, its addition amount is set to the above-mentioned range in terms of mass ratio with the amount converted into converted into $Cr_2O_3$.

When at least two of CuO, NiO, CoO, MgO, $Al_2O_3$ and $Cr_2O_3$ are used as additive, the total addition amount of the oxides may desirably be set to 0.06 to 2.0 mass % in terms of mass ratio with the amounts converted into respective oxides.

In production of the Mn—Zn ferrite, raw material powders of $Fe_2O_3$, ZnO and MnO, which are the main components, are previously weighed for a prescribed ratio and mixed to obtain a mixed powder, and then this mixed powder is calcined and finely milled. Temperature for calcination differs slightly depending on a target composition and should be appropriately selected from a range of 800° to 1,000° C. A general-purpose ball mill can be used to finely mill the calcined powder. When $SnO_2$, $TiO_2$, CuO, NiO, CoO, MgO, $Al_2O_3$ and $Cr_2O_3$ as additive are made to be contained, powders of these additives are added to the powder finely milled in respective appropriate amounts and mixed to obtain a mixture with a target composition. Then, the mixture is granulated, pressed in accordance with a usual ferrite production process, and sintered at 900° to 1,400° C. The granulation process can be performed by adding a binder such as polyvinyl alcohol, polyacrylamide, methylcellulose, polyethylene oxide or glycerol, and the pressing process can be performed by applying pressure of, for example, 80 MPa or more. The sintering and the cooling thereafter are performed in an atmosphere containing a suitable amount of oxygen or in an atmosphere having a relative partial pressure of oxygen prescribed in accordance with the above-mentioned expression (1).

Mn—Zn ferrite thus obtained and a coil component having a magnetic core made thereof have excellent impedance properties over a wide frequency band, and can effectively convert noises in a practically critical frequency range of 10 to 100 MHz into thermal energy and absorb them.

EXAMPLES

Example 1

Raw material powders of $Fe_2O_3$, ZnO and MnO were weighed for a composition of 43.0 to 52.0 mol % $Fe_2O_3$, 21.0 mol % ZnO and the remainder MnO, mixed with a ball mill, calcined in the air at 850° C. for 2 hours and milled with a ball mill for 20 hours, and a fine milled powder was obtained. This fine milled powder had its components adjusted so as to obtain the above-mentioned composition, and mixed with a ball mill for 1 hour to obtain a mixture. Then, this mixture was granulated with addition of polyvinyl alcohol, and pressed at a pressure of 80 MPa into toroidal cores (green compacts) each of which, after sintering, has an outer diameter of 25 mm, an inner diameter of 15 mm and a height (thickness) of 5 mm. Then, the green compacts were placed in a sintering furnace where an atmosphere was adjusted by flowing nitrogen so as to have a relative partial pressure of oxygen to be obtained by setting the constant b of the expression (1) to 8, were sintered at 1,300° C. for 3 hours and then cooled therein, and samples 1-1 to 1-6 shown in Table 1 were obtained.

Regarding the samples 1-1 to 1-6 thus obtained, initial permeability at 1 kHz, real part $\epsilon'$ of complex relative permittivity at 1 kHz and 1 MHz, and frequency properties of impedance at a winding number of 10 turns were measured. The results obtained are shown in Table 1 and FIG. 1. In Table 1, the samples were classified into "Invention" following the present invention and "Comparison" not following the present invention. This classification is used also in upcoming Tables 2 and 3.

TABLE 1

| Sample | | Basic Component Composition (mol %) | | | Initial Permeability | Real Part of Complex Relative Permittivity | |
|---|---|---|---|---|---|---|---|
| No. | Classification | $Fe_2O_3$ | ZnO | MnO | 1 kHz | 1 kHz | 1 MHz |
| 1-1 | Comparison | 52.00 | 21.00 | Remainder | 5023 | 51236 | 9756 |
| 1-2 | Comparison | 50.00 | 21.00 | Remainder | 4857 | 19789 | 48 |
| 1-3 | Invention | 48.00 | 21.00 | Remainder | 4759 | 18273 | 12 |
| 1-4 | Invention | 46.00 | 21.00 | Remainder | 4356 | 12310 | 9 |
| 1-5 | Invention | 44.00 | 21.00 | Remainder | 4012 | 10234 | 8 |
| 1-6 | Comparison | 43.00 | 21.00 | Remainder | 1100 | 9082 | 7 |

As apparent from the results shown in Table 1, a comparison sample 1-1 containing 52.0 mol % $Fe_2O_3$ shows a high real part $\epsilon'$ of complex relative permittivity of more than 50,000 at 1 kHz and more than 9,000 at 1 MHz, respectively, while invention samples 1-3, 1-4 and 1-5 each containing less than 50.0 mol % $Fe_2O_3$ have a low real part $\epsilon'$ of complex relative permittivity of 20,000 or less at 1 kHz and 50 or less at 1 MHz, respectively. On the other hand, a comparison sample 1-6 containing a smaller amount of $Fe_2O_3$, i.e., 43.0 mol % $Fe_2O_3$ shows an initial permeability of 1100 at 1 kHz, while the invention samples 1-3, 1-4 and 1-5 have a high initial permeability of 4,000 or more at 1 kHz. As a result, as shown in FIG. 1, regarding the frequency properties of impedance, the invention samples maintain higher impedance over a broad frequency band ranging from 10 kHz to 100 MHz than the comparison samples.

Example 2

Raw material powders of $Fe_2O_3$, ZnO and MnO as main components were weighed for a composition of 48.0 mol % $Fe_2O_3$, 21.0 mol % ZnO and the remainder MnO, and raw material powder of $SnO_2$ or $TiO_2$ was weighed in an amount of 0.05 to 5.0 mass % of the main components. All the raw material powders were mixed with a ball mill, calcined in the air at 850° C. for 2 hours, and milled with a ball mill for 20 hours, thus obtaining a fine milled powder. This fine milled powder has its components adjusted so as to obtain the above-mentioned composition, and was mixed with a ball mill for 1 hour to obtain a mixture. Then, this mixture was granulated with addition of polyvinyl alcohol, and pressed at a pressure of 80 MPa into toroidal cores (green compacts) each of which, after sintering, has an outer diameter of 25 mm, an inner diameter of 15 mm and a height (thickness) of 5 mm. Then, the green compacts were placed in a sintering furnace where an atmosphere was adjusted by flowing nitrogen so as to have a relative partial pressure of oxygen to be obtained by setting the constant b of the expression (1) to 8, were sintered at 1,300° C. for 3 hours and then cooled therein, and samples 2-1 to 2-8 shown in Table 2 were obtained.

Regarding the samples 2-1 to 2-8 thus obtained, initial permeability at 1 kHz, real part $\epsilon'$ of complex relative permittivity at 1 kHz and 1 MHz, and frequency properties of impedance at 10 kHz and 100 kHz at a winding number of 10 turns were measured. In addition, a frequency $f_k$, at which a component that converts noises into magnetic energy to remove them joins with a component that converts noises into thermal energy to remove them, was measured. The results obtained are shown in Table 2. Table 2 also includes the invention sample 1-3 of Example 1.

As apparent from the results shown in Table 2, invention samples 2-1, 2-4, 2-5, 2-6 and 2-7 each containing a prescribed amount of $SnO_2$ and/or $TiO_2$ have a lower frequency $f_k$ than the invention sample 1-3 containing no $SnO_2$ or $TiO_2$, but has substantially same impedance at 10 kHz and 100 MHz. On the other hand, comparison samples 2-2, 2-6 and 2-8 each containing a larger amount of $SnO_2$ and/or $TiO_2$ than prescribed show not only a lower initial permeability at 1 kHz but also a higher real part $\epsilon'$ of complex relative permittivity at 1 kHz and 1 MHz than the invention samples, resulting in significant reduction of impedance at 10 kHz and 100 MHz.

Example 3

Raw material powders of $Fe_2O_3$, ZnO and MnO as main components were weighed for a composition of 48.0 mol % $Fe_2O_3$, 21.0 mol % ZnO and the remainder MnO, and one or two of raw material powders of CuO, NiO, CoO, MgO, $Al_2O_3$ and $Cr_2O_3$ as additive were weighed in an amount of 0.02 to 5.0 mass % of the main components. All the raw material powders were mixed with a ball mill, calcined in the air at 850° C. for 2 hours, and milled with a ball mill for 20 hours, thus obtaining a fine milled powder. This fine milled powder had its components adjusted so as to obtain the above-mentioned composition, and was mixed with a ball mill for 1 hour to obtain a mixture. Then, this mixture was granulated with addition of polyvinyl alcohol, and pressed at a pressure of 80 MPa into toroidal cores (green compacts) each of which, after sintering, has an outer diameter of 25 mm, an inner diameter of 15 mm and a height (thickness) of 5 mm. Then, the green compacts were placed in a sintering furnace where an atmosphere was adjusted by flowing nitrogen so as to have a relative partial pressure of oxygen to be obtained by setting the constant b of the expression (1) to 8, were sintered at 1,300° C. for 3 hours and then cooled therein, and samples 3-1 to 3-10 shown in Table 3 were obtained.

Regarding the samples 3-1 to 3-10 thus obtained, initial permeability at 1 kHz and real part $\epsilon'$ of complex relative permittivity at 1 kHz and 1 MHz were measured. In addition, impedance at 10 kHz and 100 MHz, respectively, at a winding number of 10 turns was measured. The results obtained are shown in Table 3. Table 3 also includes the invention sample 1-3 of Example 1.

TABLE 2

| Sample | | Basic Component Composition (mol %) | | | Additive (mass %) | | Initial Permeability | Real Part of Complex Relative Permittivity | | Impedance (Ω) | | |
|---|---|---|---|---|---|---|---|---|---|---|---|---|
| No. | Classification | $Fe_2O_3$ | ZnO | MnO | $TiO_2$ | $SnO_2$ | 1 kHz | 1 kHz | 1 MHz | 10 kHz | 100 MHz | $f_k$(kHz) |
| 1-3 | Invention | 48.00 | 21.00 | Remainder | — | — | 4759 | 18273 | 12 | 29 | 1752 | 1570 |
| 2-1 | Invention | 48.00 | 21.00 | Remainder | 1.00 | — | 4820 | 18673 | 38 | 31 | 1523 | 756 |
| 2-2 | Comparison | 48.00 | 21.00 | Remainder | 4.00 | — | 3965 | 22660 | 165 | 13 | 865 | 654 |
| 2-3 | Invention | 48.00 | 21.00 | Remainder | — | 0.05 | 4772 | 18312 | 28 | 30 | 1698 | 987 |
| 2-4 | Invention | 48.00 | 21.00 | Remainder | — | 0.50 | 4812 | 18735 | 40 | 31 | 1589 | 759 |
| 2-5 | Invention | 48.00 | 21.00 | Remainder | — | 3.00 | 4520 | 19275 | 47 | 22 | 1489 | 689 |
| 2-6 | Comparison | 48.00 | 21.00 | Remainder | — | 5.00 | 3850 | 21325 | 123 | 12 | 953 | 635 |
| 2-7 | Invention | 48.00 | 21.00 | Remainder | 0.05 | 1.00 | 4815 | 18732 | 39 | 30 | 1425 | 723 |
| 2-8 | Comparison | 48.00 | 21.00 | Remainder | 2.00 | 2.50 | 3756 | 22534 | 156 | 11 | 821 | 621 |

TABLE 3

| Sample No. | Classification | Basic Component Composition (mol %) Fe$_2$O$_3$ | ZnO | MnO | Additive Name | Amount (mass %) | Initial Permeability 1 kHz | Real Part of Complex Relative Permittivity 1 kHz | 1 MHz | Impedance (Ω) 10 kHz | 100 MHz |
|---|---|---|---|---|---|---|---|---|---|---|---|
| 1-3 | Invention | 48.00 | 21.00 | Remainder | — | — | 4759 | 18273 | 12 | 29 | 1752 |
| 3-1 | Invention | 48.00 | 21.00 | Remainder | CuO | 0.02 | 4452 | 18021 | 7 | 25 | 2560 |
| 3-2 | Invention | 48.00 | 21.00 | Remainder | NiO | 0.10 | 4210 | 17231 | 4 | 24 | 3572 |
| 3-3 | Invention | 48.00 | 21.00 | Remainder | CoO | 0.50 | 5856 | 15234 | 5 | 42 | 2987 |
| 3-4 | Invention | 48.00 | 21.00 | Remainder | MgO | 1.00 | 4130 | 13212 | 6 | 23 | 2785 |
| 3-5 | Invention | 48.00 | 21.00 | Remainder | Al$_2$O$_3$ | 1.50 | 4256 | 11250 | 8 | 24 | 2456 |
| 3-6 | Invention | 48.00 | 21.00 | Remainder | Cr$_2$O$_3$ | 2.00 | 4956 | 9823 | 7 | 35 | 2559 |
| 3-7 | Comparison | 48.00 | 21.00 | Remainder | CoO | 4.00 | 1256 | 8232 | 2 | 4 | 3823 |
| 3-8 | Comparison | 48.00 | 21.00 | Remainder | Cr$_2$O$_3$ | 5.00 | 2653 | 8021 | 3 | 8 | 3712 |
| 3-9 | Invention | 48.00 | 21.00 | Remainder | CoO + MgO | 1.00 + 0.50 | 5230 | 10192 | 9 | 37 | 2512 |
| 3-10 | Comparison | 48.00 | 21.00 | Remainder | NiO + CuO | 2.00 + 2.50 | 1542 | 8123 | 3 | 5 | 3726 |

As apparent from the results shown in Table 3, invention samples 3-3 and 3-6 containing a prescribed amount of CoO and Cr$_2$O$_3$, respectively, show not only a lower real part $\epsilon'$ of complex relative permittivity but also a higher initial permeability at 1 kHz than the invention sample 1-3 containing no SnO$_2$ or TiO$_2$, and, as a result, shows an increased impedance at 10 kHz and 100 MHz. Further, invention samples 3-1, 3-2, 3-4 and 3-5 containing as additive a prescribed amount of CuO, NiO, MgO and Al$_2$O$_3$, respectively, show substantially same initial permeability at 1 kHz as the invention sample 1-3 but show a lower real part $\epsilon'$ of complex relative permittivity particularly at 1 MHz, and, as a result, show an increased impedance at 100 MHz. On the other hand, comparison samples 3-7, 3-8 and 3-10 each containing a larger amount of the additive(s) than prescribed show a considerably lower initial permeability at 1 kHz than the invention samples, and, as a result, show a remarkably decreased impedance at 10 kHz.

What is claimed is:

1. A coil component using as a magnetic core a Mn—Zn ferrite containing basic components including 44.0 to 50.0 mol % (50.0 mol % is excluded) Fe$_2$O$_3$, 4.0 to 26.5 mol % ZnO and remainder MnO, and which has a real part $\epsilon'$ of complex relative permittivity of 20,000 or less at 1 kHz, and 50 or less at 1 MHz as well.

2. A coil component using as a magnetic core a Mn—Zn ferrite according to claim 1, wherein the Mn—Zn ferrite further contains as additive at least one of 0.01 to 4.0 mass % SnO$_2$ and 0.01 to 3.0 mass % TiO$_2$ with an upper limit being 4.0 mass % in total in case of both thereof contained.

3. A coil component using as a magnetic core a Mn—Zn ferrite according to claim 1, wherein the Mn—Zn ferrite further contains as additive at least one of 0.01 to 2.0 mass % CuO, 0.01 to 2.0 mass % NiO, 0.01 to 2.0 mass % CoO, 0.01 to 2.0 mass % MgO, 0.01 to 2.0 mass % Al$_2$O$_3$ and 0.01 to 2.0 mass % Cr$_2$O$_3$ with an upper limit being 2.0 mass % in total in case of at least two thereof contained.

\* \* \* \* \*